3,307,391
VISCOSITY MEASURING DEVICE
George E. Parker, Rockford, Ill., assignor to Woodward Governor Company, Rockford, Ill., a corporation of Illinois
Filed Jan. 25, 1965, Ser. No. 427,890
3 Claims. (Cl. 73—56)

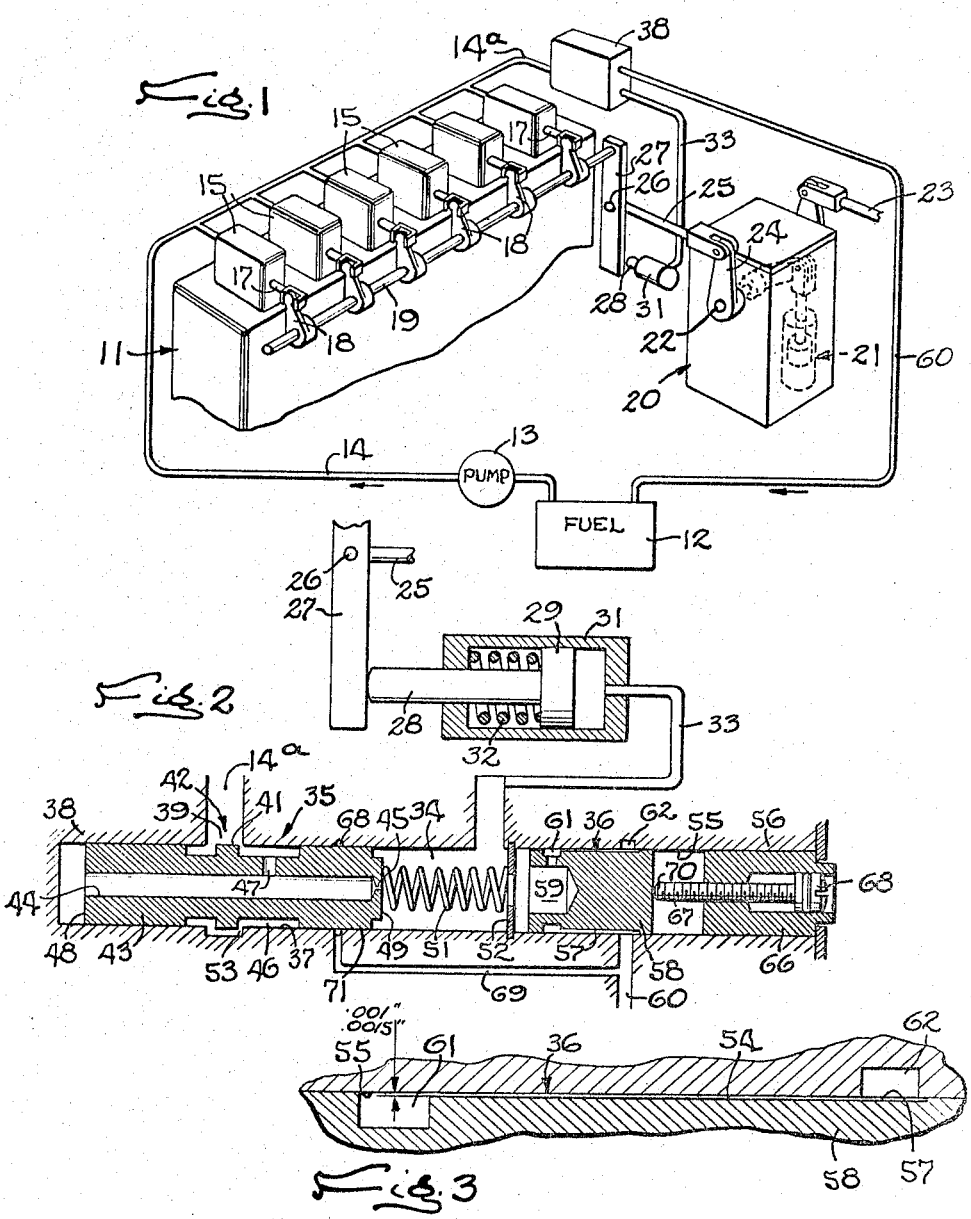

This invention relates to a device for sensing changes in the viscosity of a liquid under pressure by measuring changes in the pressure within a chamber into which the liquid is forced to flow at a constant rate and allowing the liquid to escape through an orifice so shaped that the outflow is inversely proportional to the liquid viscosity, the pressure within the chamber thus being an indication of the liquid viscosity. The invention has more particular reference to a viscosity measuring device of the above character in which the constant flow of the liquid into the chamber is controlled by a regulating valve formed by a plunger slidable in a cylinder and coacting with an opening which communicates with the liquid source.

The primary object of this invention is to render more accurate the viscosity measurement in a device of the above character by eliminating the otherwise detrimental effect on the chamber pressure resulting from the leakage of the liquid in either direction along the valve plunger.

The invention also resides in the novel and simple means for diverting the leakage out of the valve.

Other objects and advantages of the invention will become apparent from the following detailed description taken in connection with the accompanying drawings, in which FIGURE 1 is a fragmentary perspective view of a fuel regulator embodying the novel features of the present invention.

FIG. 2 is a schematic view and hydraulic circuit diagram.

FIG. 3 is an enlarged view of a portion of FIG. 2.

In the drawings, the invention is shown, for purposes of illustration, in a system for regulating the flow of liquid fuel to a diesel prime mover 11 so as to limit such flow in accordance with the prevailing viscosity of the fuel being used. Fuel is supplied to the engine from a tank 12 by a pump 13 which delivers fuel to a line 14 at a pressure which is maintained constant by the usual pressure relief and by-pass valve (not shown) associated with the pump. The line supplies fuel to a plurality of fuel injectors 15 associated with the respective cylinders of the engine and operable to deliver varying amounts of fuel depending upon the position of injector control rods 17 simultaneously positioned by arms 18 secured to a rockshaft 19. In the illustrated construction, movement of the rods 17 inwardly or to the left increases the fuel intake rate of the engine cylinders.

Operation of the engine at constant speed is maintained by a governor 20, which may be of the type shown in Patent No 2,384,115, including the usual flyweight speed sensor (not shown) driven from the engine crankshaft and controlling the energization of a reversible power actuator such as a hydraulic servo 21 coupled to a terminal shaft 22 and acting to change the angular position of the shaft in accordance with deviations in the prime mover speed relative to a predetermined value determined by the manually selected position of a throttle linkage 23. A crank 24 on the shaft 22 is rocked back and forth in response to detected deviations in speed relative to the governor speed setting and is coupled through a link 25 and a pivot 26 on a lever 27 fast at one end on the injector positioning shaft 19. Movement of the link to the right swings the lever counterclockwise so as to similarly swing the arms 18 with the result that the injector rods 17 are moved inwardly or to the left in FIG. 1 thereby increasing the rate at which fuel is fed from the line 14 to each of the cylinders of the engine.

Under certain conditions of service operation, it may be necessary to operate the engine with different fuels having heat contents per unit volume which may vary substantially giving rise to the danger of overloading the engine because the governor responds in the same way irrespective of the kind of fuel being used. To compensate automatically for such differences in fuels and limit the maximum volumetric rate of fuel supply in each instance to a predetermined safe value, advantage is taken of the fact that the heat content of ordinary hydrocarbon fuels varies approximately and directly with the viscosity of the fuel, that is, the more viscous and denser the fuel, the higher is its heat content per unit volume. Accordingly, provision is made for continuously measuring the viscosity of the fuel being supplied to the engine and correspondingly adjusting the position of a reversible movable stop 28 which operates to limit the maximum volumetric rate at which the fuel being used at any time may be supplied to the engine under the control of the governor 20

The limiting action by the stop 28 may be achieved in various ways as by forcing a yielding of the connection between the governor servo 21 and the fuel control shaft 19 or by actuation of a so-called dump valve to by-pass pressure fluid out of the servo as illustrated and described in the aforesaid patent. In the present instance, the limit action by the stop is effected by direct blocking of the movement of the governor servo whenever the fuel supply increases to the permissible maximum value determined by the prevailing viscosity of the fuel and therefore the position of the stop.

Herein the stop 28 comprises the outer end of the rod of a piston 29 slidable in a cylinder 31 and urged by a compression spring 32 inwardly in the fuel limit decreasing direction. The position of the stop is thus determined by the pressure in the cylinder. The head end of the cylinder communicates through a passage 33 with a chamber 34 to which the fuel being supplied to the engine is delivered at a constant volumetric rate of flow determined by a device 35 while this flow is allowed to escape from the chamber to a low pressure space through an orifice 36. The latter is sized and shaped to cause a pressure drop between the chamber and such space which drop is at all times determined by the viscosity of the fuel being used. The result is that the pressure behind the stop piston 29 increases and decreases with the viscosity of the fuel thus changing the position of the stop so as to correspondingly decrease and increase the maximum fuel flow limit. Herein the stop is positioned to act on the free end of the fuel control lever 27 and therefore at greater mechanical advantage than the rod 25 so that the force holding the stop position is sufficient to overcome that of the governor servo.

In the present instance, the device 35 for delivering a constant flow of fuel to the chamber 34 from the high pressure engine supply source includes a cylinder 37 within a casing 38 into which the downstream end 14a of the injector supply line 14 extends and terminates at a port 39 cooperating with a land 41 to form a pressure regulating valve 42. The land is disposed intermediate the ends of a hollow plunger 43 having a passage 44 extending axially therethrough and terminating at the end adjacent the chamber 34 in a restricted orifice 45. The outlet side of the valve formed by an annular space 46 communicates with the passage 44 through a hole 47.

The opposite end of the passage 44 communicates with the closed end of the cylinder 37 so that the pressure on the end 48 of the plunger 34 urges the latter toward the chamber 34. This pressure is balanced against the pressure within the chamber acting on the end 49 of the plunger combined with the force of a spring 51 compressed between the plunger and an abutment 52. The result is that the width of the valve opening 53 is varied automatically with changes in the chamber pressure to maintain constant the drop in pressure across the orifice 45 and therefore a flow of fuel into the chamber 34 at a constant rate.

The orifice 36 comprises an extremely thin space 54 which is of substantial length and width and is tubular in form in the present instance. It is defined by the internal wall 55 of a cylinder 56 within the casing 38 and the opposite cylindrical surface 57 of a plunger 58 slidable within the the cylinder 55. One end of the so-called laminar flow orifice thus formed communicates with the chamber 34 through a recess 59 in the plunger and a surrounding annular space 61. Near its opposite end, the tubular orifice is open to an annulus 62 located at the end of a pipe 60 by which the escaping fuel is returned to the tank 12, the annular and outlet end of the tubular orifice thus being maintained at a constant low pressure.

Means is provided for adjusting the effective length of the laminar flow orifice 54 to enable the position of the stop 28 to be varied for a given viscosity of fuel and the maximum fuel flow limit to be correlated with the heat content of the fuel. Herein this means comprises a plug 66 fixed in the outer end of the cylinder 56 and supporting a screw 67 having an exposed head 68 and an inner end 70 which forms an abutment for limiting the outward movement of the plunger 58 under the pressure exerted on its inner end by the fluid in the chamber 34. The plunger is slidable in the cylinder 55 so that by adjusting the screw, the length of the orifice between the high and low pressure spaces 61 and 62 may be varied as desired.

In accordance with the present invention, provision is made for trapping and disposing of any liquid which tends to leak from the high pressure area 46 along the exterior of the plunger 43 and toward the chamber 34. This is accomplished by forming around the cylinder 37 a groove 68 of small cross-section opening toward and extending around the exterior of the plunger between the chambers 34 and 46 and spaced from the adjacent ends thereof. The groove communicates through a passage 69 with the drain and low pressure area 60. The high pressure liquid tending to leak along the plunger and toward the chamber 34 is trapped in the groove and escapes through the passage 69.

Since the groove 68 is at low pressure, there is a tendency for liquid to leak out of the chamber 34 toward the groove through the extremely thin tubular clearance space between the cylinder 37 and the orifice end portion of the plunger 43 even though the plunger is made to fit quite closely in the cylinder. This laminar passage indicated at 71 is substantially thinner than the orifice 54 and constitutes a secondary laminar orifice whose flow capacity is combined with that of the orifice 54 in determining the pressure developed in the chamber 34. Thus this pressure is a more accurate measure of the viscosity of the fuel being used since it is not affected by leakage in either direction along the plunger between the chamber 34 and the space 46.

By making the tubular orifice about one inch in diameter and also in axial length and from .001 to .0015 of an inch in radial thickness, it has been found that with a constant press drop of 13 p.s.i. across the orifice 45 which is about .014 of an inch in diameter and the resulting flow into the chamber 34 with the accompanying escape of this flow through the laminar orifice 36, the pressure in the chamber 34 and exerted on the piston 29 of the stop positioning servo will correspond approximately to the viscosity of the fuel being supplied to the engine, the proportionality being substantial linear. As a result, the position of the stop 28 at any time corresponds quite closely to the heat content per unit volume of the fuel being supplied to the engine. Thus, by adjusting the axial position of the plunger 58 to vary the flow rate through the laminar orifice 54, the position of the stop 28 may be correlated with the viscosity of a given fuel. The position of the stop is then changed automatically to correspond to the viscosity of other fuels that may be used so that irrespective of the kind of fuel, the rate of flow to the engine under the control of the governor will be limited to a predetermined maximum. Changes in the kind of fuel are thus compensated for automatically and the engine is protected at all times against the danger of overloading.

I claim as my invention:

1. A device for measuring the viscosity of a liquid having, in combination, a source of said liquid maintained under pressure and a cylinder closed at one end and communicating with said source at a valve opening, a chamber filled with said liquid and defined by the opposite end portion of said cylinder and the end of a hollow plunger slidable in the cylinder, a spring urging the plunger toward said closed cylinder end, a flow restricting orifice extending through said plunger end and to said chamber, means on said plunger cooperating with one edge of said opening to form a valve responsive to the opposing forces exerted on said plunger by the pressure therein and by said spring and controlling the admission of liquid from said source to the interior of said plunger so as to maintain a constant pressure drop across said orifice and a constant flow into said chamber, means defining an outlet orifice allowing liquid supplied through said first orifice to escape continuously from said chamber to a low pressure space at a rate inversely proportional to the viscosity of the liquid, means for sensing changes in the pressure in said chamber as an indication of viscosity of said liquid, and means along said plunger and cylinder between said valve and said chamber for trapping and diverting out of the cylinder to a low pressure space any of said liquid which leaks along the exterior of the plunger toward said chamber.

2. A viscosity sensor as defined in claim 1 including means along said plunger and cylinder between said valve and said chamber for diverting to a low pressure space and of said liquid which leaks out of said chamber and along said plunger.

3. A viscosity sensor as defined in claim 2 in which said trapping means includes an annular groove around said plunger and cylinder between said valve and said chamber and communicating with a lower pressure space so as to constitute the clearance around said plunger between said groove and said chamber a secondary laminar orifice cooperating with said outlet orifice in allowing the escape of the liquid delivered through said flow restricting orifice into said chamber.

References Cited by the Examiner

UNITED STATES PATENTS

| | | | |
|---|---|---|---|
| 1,879,197 | 9/1932 | Greenwald | 138—43 |
| 1,918,959 | 7/1933 | Culp | 138—43 |
| 2,050,242 | 8/1936 | Booth | 73—55 |
| 2,085,848 | 7/1937 | Cornelius | 138—46 |
| 2,471,541 | 5/1949 | Plass. | |
| 2,621,672 | 12/1952 | Jacobs | 137—20 |
| 2,872,939 | 2/1959 | Terry | 137—504 |
| 2,917,074 | 12/1959 | Terry | 137—504 |
| 3,130,747 | 4/1964 | Benaway | 137—504 |
| 3,170,503 | 2/1965 | Isley et al. | 158—36 |

FOREIGN PATENTS

| | | |
|---|---|---|
| 1,101,994 | 4/1955 | France. |

FREDERICK KETTERER, *Primary Examiner.*